US007483550B2

(12) United States Patent
Oka et al.
(10) Patent No.: US 7,483,550 B2
(45) Date of Patent: Jan. 27, 2009

(54) METHOD AND SYSTEM FOR EVALUATING MOVING IMAGE QUALITY OF DISPLAYS

(75) Inventors: Koichi Oka, Otsu (JP); Yoshi Enami, Ritto (JP)

(73) Assignee: Otsuka Electronics Co., Ltd, Osaka (JP)

( * ) Notice: Subject to any disclaimer, the term of this patent is extended or adjusted under 35 U.S.C. 154(b) by 431 days.

(21) Appl. No.: 10/558,933

(22) PCT Filed: Jun. 2, 2004

(86) PCT No.: PCT/JP2004/008001

§ 371 (c)(1), (2), (4) Date: Dec. 2, 2005

(87) PCT Pub. No.: WO2004/109634

PCT Pub. Date: Dec. 16, 2004

(65) Prior Publication Data

US 2007/0024627 A1 Feb. 1, 2007

(30) Foreign Application Priority Data

Jun. 3, 2003 (JP) ............................ 2003-158213

(51) Int. Cl.
*G06K 9/00* (2006.01)
*H04N 17/00* (2006.01)
*H04N 17/02* (2006.01)

(52) U.S. Cl. ....................... 382/107; 348/180; 348/187; 348/189; 356/239.2; 382/106

(58) Field of Classification Search ................. 345/474; 356/630, 239.2; 382/106, 107; 348/180-189
See application file for complete search history.

(56) References Cited

U.S. PATENT DOCUMENTS 4,958,912 A * 9/1990 Inaba et al. .................... 349/2

(Continued)

FOREIGN PATENT DOCUMENTS

EP 0 298 460 1/1989

(Continued)

OTHER PUBLICATIONS

Igarashi et al., "31.2: Proposal of the Perceptive Parameter Motion Picture Response Time (MPRT)", Society for Information Display, vol. XXXIV, 4 pages, (2003).

(Continued)

*Primary Examiner*—Samir A Ahmed
*Assistant Examiner*—Nancy Bitar
(74) *Attorney, Agent, or Firm*—Finnegan, Henderson, Farabow, Garrett, & Dunner, L.L.P.

(57) ABSTRACT

A test pattern is moved on a screen 5 subject to measurement with the field of view of an image sensor pursuing the motion of the test pattern so as to observe BEW. Subsequently, the field of view 33 of the image sensor is moved at the same velocity vc as in the foregoing observation to capture an image of a static pattern PE, and a blur width W along the scrolling direction that appears in a distribution profile of the captured image is observed. Based upon the blur width W and the exposure time of the image sensor for capturing the image of the static pattern PE, the moving velocity of the test pattern at the time of observation of the BEW is estimated, and by using the moving velocity, the BEW is normalized. Evaluation of the moving image quality of the screen is carried out by using the normalized N BEW. The moving velocity of the original test pattern can thus be estimated easily and accurately, and accordingly, the moving image quality of the screen can be evaluated accurately.

8 Claims, 6 Drawing Sheets

U.S. PATENT DOCUMENTS

| | | | | |
|---|---|---|---|---|
| 5,391,985 | A | 2/1995 | Henley | |
| 5,570,011 | A * | 10/1996 | Henley | 324/158.1 |
| 6,700,627 | B2 * | 3/2004 | Yang et al. | 348/674 |
| 6,987,530 | B2 * | 1/2006 | McConica | 348/208.6 |
| 6,992,697 | B2 * | 1/2006 | Ali | 348/189 |
| 2002/0097395 | A1 * | 7/2002 | Smith et al. | 356/239.2 |
| 2007/0211146 | A1 * | 9/2007 | Enami et al. | 348/184 |
| 2007/0222861 | A1 * | 9/2007 | Enami | 348/196 |
| 2007/0273628 | A1 * | 11/2007 | Sato et al. | 345/87 |

FOREIGN PATENT DOCUMENTS

| | | | |
|---|---|---|---|
| JP | 06-38247 | | 2/1994 |
| JP | 06038247 | * | 2/1994 |
| JP | 2001-54147 | | 2/2001 |

OTHER PUBLICATIONS

Tsumura, "Method and Device for Evaluating Display Device", Patent Abstracts of Japan, of Japanese Publication No. 2001-204049, filed Jul. 27, 2001.

Okamoto, "Device and Method for Displaying Picture", Patent Abstracts of Japan, of Japanese Publication No. 2001-296851, filed Oct. 26, 2001.

* cited by examiner

METHOD AND SYSTEM FOR EVALUATING MOVING IMAGE QUALITY OF DISPLAYS

TECHNICAL FIELD

The present invention relates to a method and system for evaluating moving image quality of displays which is capable of evaluating moving image quality of displays based on blurring of a scrolled test pattern displayed on a screen of a display device subject to evaluate.

PRIOR ART

Evaluation of moving image quality is conducted by measuring blurred edge of a moving image displayed on a screen of a display device such as a Liquid Crystal Display (LCD), Cathode Ray Tube (CRT) display, Plasma Display Panel (PDP), or Electroluminescence (EL) display. One method of such evaluation is a process in which a camera is adapted to pursue the move of a scrolled image similar as a rotation of eye ball while pursuing by human eye, and capture an image thereof as a stationary image, and the sharpness of the captured stationary image is evaluated. In the case of a display device with an image hold type display with a long liquid crystal response time such as LCD, in particular, the sharpness of the image decrease in the edges. A method in which the decline of the sharpness is digitized and used as an index is disclosed as method for evaluating moving image quality of displays. (Japanese Patent Laid-open Publication No. 2001-204049)

However, the foregoing method for evaluating moving image quality only focuses on objectively analyzing the profile of the captured image displayed on the screen when the scrolling test pattern is captured by the camera. The foregoing method for evaluating moving image quality does not provide a method for accurately and directly extracting an index that indicates moving image quality display performance of the screen of the display device.

The index that indicates moving image quality of display as a performance of the screen is desirably an index that corresponds to, for example, "afterimage duration" that is easy to recognize intuitively.

One of method to obtain the index is described by a reference indicated below. Y. Igarashi, T. Yamamoto, Y. Tanaka, J. Someya, Y. Nakakura, M. Yamakawa, S. Hasegawa, Y. Nishida and T. Kurita: "Proposal of the Perceptive Parameter Motion Picture Response Time (MPRT)", SID '03 Digest of Technical Papers, p. 1039 (May 2003)

However, in order to obtain such an index, conventionally, one has to know the screen display parameters of the display device including the screen size, the number of scanning lines and frame duration. Therefore, a method for evaluating moving image quality of displays that provides an easier way to determine an index for evaluating the moving image quality of a display screen has been awaited.

It is therefore an object of the present invention to provide a method and system for evaluating moving image quality of displays without usage of the screen display properties. The method and the system should be capable of acquiring an intuitively recongnizable index for evaluating the moving image quality of a display screen through a simple process.

DISCLOSURE OF THE INVENTION

In a method for evaluating moving image quality of displays according to the present invention, a test pattern is scrolled on a screen as a subject of measurement with the field of view of an image sensor pursuing the move of the scrolled pattern so as to observe a first blurred edge. Subsequently, with the field of view of the image sensor being moved at the same velocity as in the foregoing observation, an image of a still test pattern is captured so as to observe a second blurred edge along the scrolling direction appearing in the captured image. Based on the second blurred edge and the exposure time of the image sensor for capturing the image of the still test pattern, the moving velocity of the scrolled test pattern can be estimated. Then, by using the estimated moving velocity of the scrolled test pattern, the first blurred edge width is normalized, and the moving image quality of the screen can be evaluated with use of the normalized first blurred edge width. The foregoing still test pattern may be the same as or different from the scrolled test pattern.

As described above, by capturing an image of a still test pattern while moving the field of view of the image sensor at the same velocity at which the field of view of the image sensor pursues the move of the scrolled test pattern and then measuring the second blurred edge, the moving velocity of the original scrolled test pattern can be easily estimated. Then by using the moving velocity of the scrolled test pattern, the first blurred edge width is normalized. The moving image quality of the screen can be evaluated by using the normalized first blurred edge width.

Whether the move of the scrolled test pattern is pursed or not can be determined such that the field of view of the image sensor is moved at a variety of velocities, the images of scrolled test pattern are captured, and the moving velocity of the field of view of the image sensor, at which a blurred edge width in the captured images is the smallest, is used for the determination. Alternatively, the determination can be made based upon the moving velocity of the field of the image sensor at which move of the positions of blurred edge in consecutively captured images at each velocity, is the smallest.

The first blurred edge is preferably measured in a luminance distribution profile that appears on the detector plane of the image sensor by using the difference in pixel between a part where the luminance is higher than the minimum luminance by a predetermined threshold ratio or a predetermined threshold value. This is because there are cases where it is difficult to specify the pixels that correspond to the start and end of blurring.

For the same reason, the second blurred edge is preferably measured in a luminance distribution profile that appears on the detector plane of the image sensor by using the difference in pixel between a part where the luminance is higher than the minimum luminance by a predetermined threshold ratio or a predetermined threshold value.

The predetermined threshold ratio or predetermined threshold value may be the same or may be different for the first blurred edge and the second blurred edge.

Regarding the exposure time of the image sensor, a value that is set by operation of image sensor may be used. Alternatively, it can be determined by capturing an image of a still test pattern on the screen while moving the field of view of the image sensor at a known velocity, and measuring the width of the image of the still test pattern that is focused on the detector place of the image sensor.

The exposure time of the image sensor may also be determined by capturing an image of pulsed light with a predetermined period and measuring the number of times of detection of the light that appears on the detector plane of the image sensor.

Additionally, a system for evaluating moving image quality of displays according to the present invention is a system for implementing the foregoing method for evaluating moving image quality of displays.

As described so far, according to the present invention, by capturing an image of a still test pattern while moving the field of view of the image sensor at the same velocity at which the field of view of the image sensor pursues the move of the scrolled test pattern and then measuring a second blurred edge, the moving velocity of the original scrolled test pattern can be easily estimated. Therefore, by normalizing the first blurred edge width by using the moving velocity of the scrolled test pattern, and then by using the normalized first blurred edge width, the moving image quality of the screen can be accurately evaluated.

BRIEF DESCRIPTION OF THE DRAWINGS

FIGS. 3(*b*) and 3(*c*) each show a luminance distribution profile of the test pattern P detected at the detector plane 31 of the CCD camera, in which FIG. 3(*c*), in particular, shows a luminance distribution profile of the test pattern at the time when the image of the test pattern is displayed with the smallest blur. FIG. 3(*d*) is an enlarged view of an edge part of the luminance distribution profile of the test pattern P in FIG. 3(*c*).

FIG. 4 (*a*) shows a static test pattern comprising an edge PE, and FIG. 4(*b*) shows a luminance distribution profile of an image formed on the detector plane 31 of the CCD camera 3 when a galvanometer mirror 2 is rotated at an angular velocity of ω0.

BEST MODE FOR CARRYING OUT THE INVENTION

Specific embodiments of the present invention will be hereinafter described in detail referring to the appended drawings.

Figure 1:
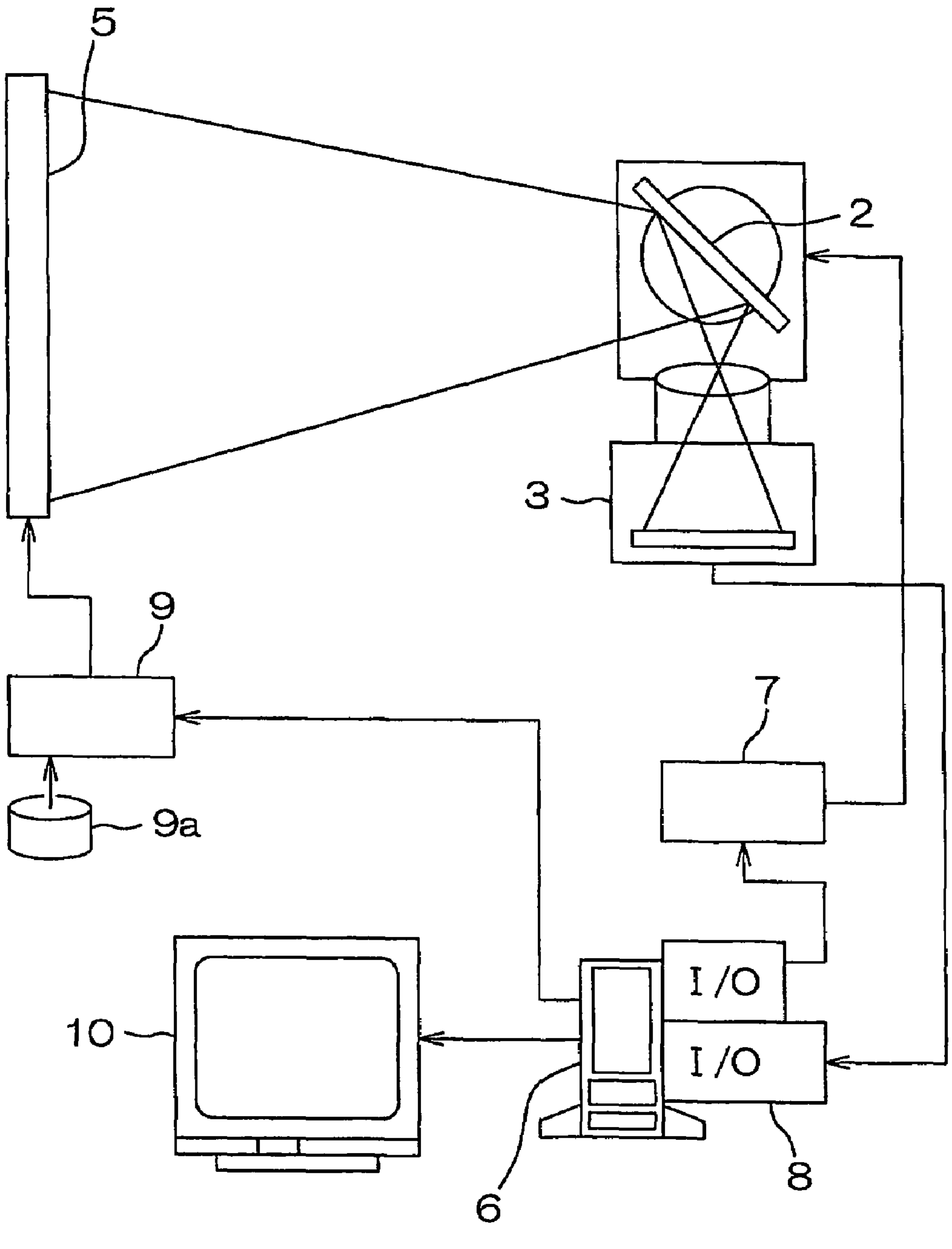
FIG. 1 is a block diagram showing the configuration of a system for implementing a method for evaluating moving image quality of displays according to one embodiment of the present invention.

FIG. 1 is a block diagram illustrating the configuration of a system for evaluating moving image quality of displays according to the present invention. The system for evaluating moving image quality of displays includes a galvanometer mirror 2, and a CCD camera 3 that captures images of a screen 5 of a display device subject to evaluation through the galvanometer mirror 2.

The galvanometer mirror 2 comprises a mirror attached to the rotation axis of a permanent magnet that is rotatably disposed in a magnetic field generated when electric current flows through a coil, which allows the mirror to rotate smoothly and rapidly.

The CCD camera 3 has a field of view for imaging that covers a part of or the entire screen 5 of the display device subject to evaluation. The galvanometer mirror 2 is disposed between the CCD camera 3 and the screen 5 so that the field of view of the CCD camera 3 can move on the screen 5 in a one-dimensional direction (hereinafter referred to as the "scrolling direction") as the galvanometer mirror 2 rotates. A rotational drive signal is transmitted from the computer control section 6 to the galvanometer mirror 2 through a galvanometer mirror drive controller 7. An image signal captured by the CCD camera 3 is fetched into the computer control section 6 through an image capture I/O board 8.

Meanwhile, instead of the arrangement where the galvanometer mirror 2 and the CCD camera 3 are provided independently, a CCD camera such as a lightweight digital camera itself may be situated on a rotary table so that it is rotationally driven by a rotary drive motor.

A display control signal for selecting the display screen 5 is transmitted from the computer control section 6 to an image signal generator 9 which, based on the display control signal, provides an image signal (stored in an image memory 9*a*) for displaying a moving image of a test pattern P to the display device subject to evaluation. In addition, a liquid crystal monitor 10 is connected to the computer control section 6.

Figure 2:
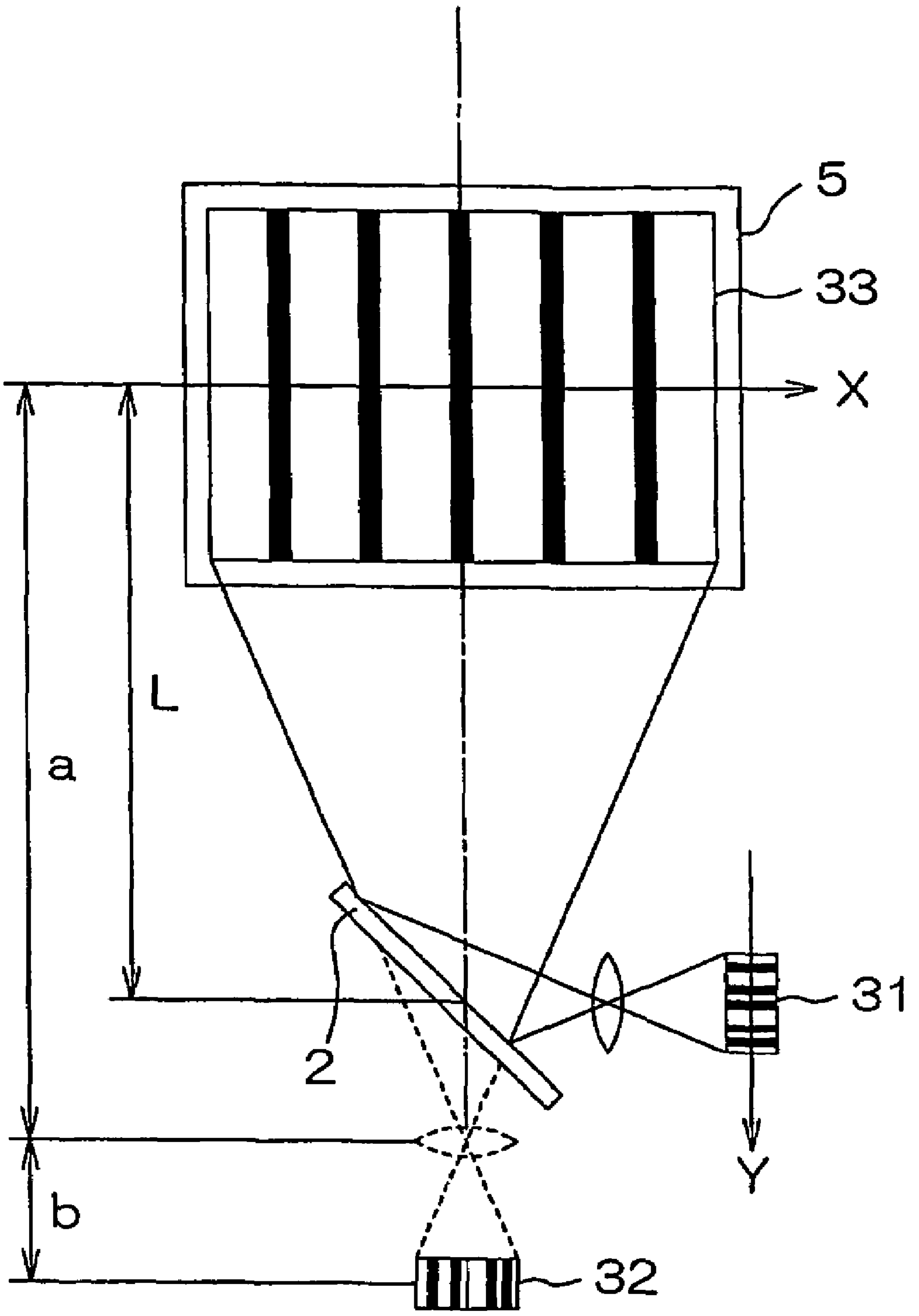
FIG. 2 is an optical path diagram showing a positional relationship between a detector plane 31 of a CCD camera and a screen 5 of a display device subject to evaluation.
Figure 3A:
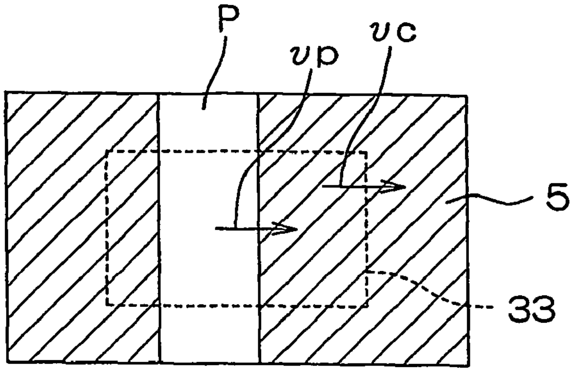
FIG. 3(*a*)-(*d*) illustrate a method for evaluating moving image quality of displays, in which FIG. 3(*a*) shows a test pattern P scrolling at a velocity of vp indicated by an arrow and a field of view 33 corresponding to the detector plane 31 of the CCD camera that is moving to follow the scroll of the test pattern at a moving velocity of vc indicated by an arrow.
Figure 3B:
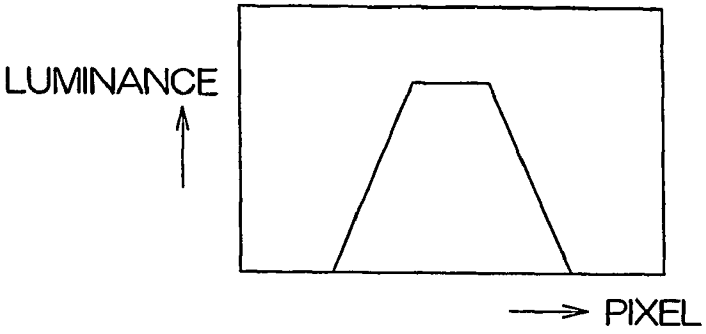
Figure 3C:
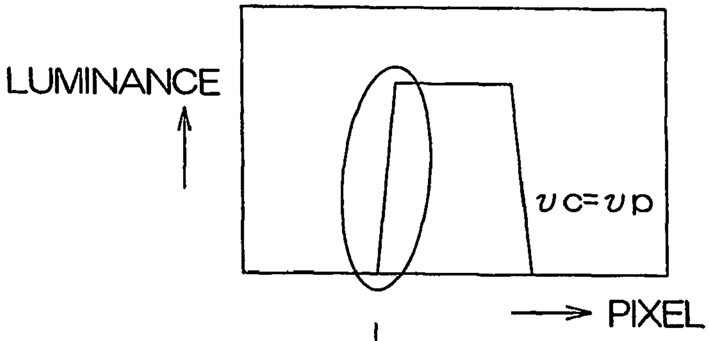
Figure 3D:
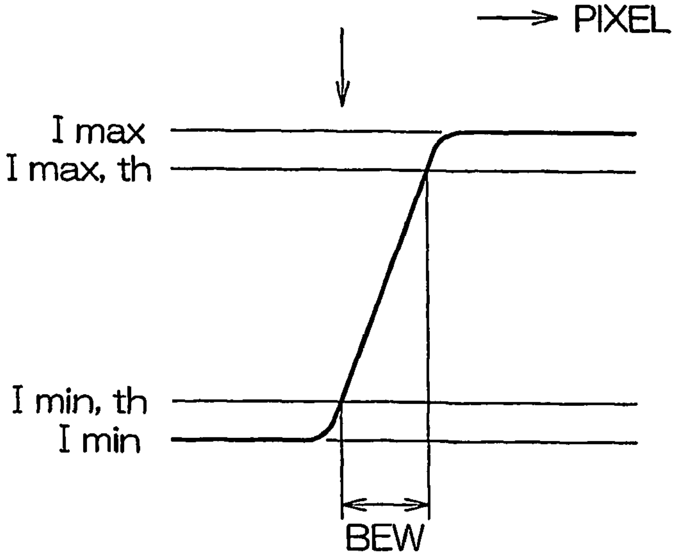

FIG. 2 is an optical path diagram showing a positional relationship between the detector plane 31 of the CCD camera 3 and the screen 5 of the display device subject to evaluation. Light rays from the field of view 33 of the CCD camera 3 on the screen 5 are reflected by the galvanometer mirror 2 to be incident on the lens of the CCD camera 3 and detected at the detector plane 31 of the CCD camera 3. The mirror image 32 of the detector plane 31 of the CCD camera 3 is drawn with broken lines on the rear side of the galvanometer mirror 2.

Let the distance along the optical path between the display device subject to evaluation and the galvanometer mirror 2 be represented by L. Let the distance along the optical path between the display device subject to evaluation and the lens be represented by a, and the distance from the lens to the detector plane 31 be represented by b. If the focal length f of the lens is known, the relationship between a and b can be determined by the following equation:

$$1/f=1/a+1/b$$

Assume that a coordinate of the screen 5 of the display device subject to evaluation in the scrolling direction is X, and that a coordinate of the detector plane 31 of the CCD camera 3 in the scrolling direction is Y. Set X0, the origin of X, at the center of the screen of the display device subject to evaluation, and set Y0, the origin of Y, at the point corresponding to X0. If the magnification of the lens of the CCD camera 3 is M, $$X=-MY(M>0)$$

is satisfied.

The magnification M is expressed using the aforesaid a and b as follows:

$$M=b/a$$

If the galvanometer mirror 2 is rotated by an angle of θ, the corresponding position on the screen 5 of the display device subject to evaluation deviates with respect to the rotation axis of the galvanometer mirror 2 by an angle of 2θ. The coordinate X on the screen 5 of the display device subject to evaluation that corresponds to the angle 2θ is expressed as follows:

$$X=L \tan 2\theta$$

A modification of the equation above gives the pursuing equation:

$$\theta=\arctan(X/L)/2$$

The equation X=L tan 2θ is differentiated by time to give the pursuing equation:

$$v=2L\omega\cos^{-2}(2\theta)$$

Here, v represents the velocity of the field of view 33 moving on the screen, and ω is the angular velocity (ω=dθ/dt) of the galvanometer mirror. When θ is a minute angle, $\cos^2(2\theta)\rightarrow 1$ can be assumed. Then, the equation above can be modified as:

$$\omega=v/2L \quad \text{(a)}$$

Accordingly, it is possible to assume that the velocity v of the field of view 33 moving on the screen and the angular velocity ω of the galvanometer mirror are proportional to each other.

Now, a method for evaluating moving image quality of displays will be described with reference to FIGS. 3(*a*)-3(*d*).

Assume that the test pattern P for evaluation displayed on the screen 5 of the display device subject to evaluation be a zonal test pattern P with higher luminance than the ground that extends over a certain length along the scrolling direction. When the galvanometer mirror 2 is rotated at a certain angular velocity in response to the movement of the test pattern P on the screen 5 of the display device subject to evaluation, an image of the moving pattern P is captured by the CCD camera 3. Here, it is assumed that the photosensor of the CCD camera 3 is kept exposed to light during the rotation of the galvanometer mirror 2. FIG. 3(*a*) shows a test pattern P moving at a velocity of vp indicated by an arrow and the field of view 33 corresponding to the detector plane 31 of the CCD camera that is moving to follow the motion of the test pattern at a velocity of vc indicated by an arrow.

Luminance distribution profiles detected at the detector plane 31 of the CCD camera are represented as FIGS. 3(*b*) and 3(*c*). The horizontal axis in FIGS. 3(*b*) and 3(*c*) represents pixels arranged along the scanning direction, and the vertical axis represents luminance. Let an angular velocity of the galvanometer mirror 2 be represented as ω, then the angular velocity ω is varied to determine the angular velocity at which the image of the test pattern P is captured with the smallest blur, which is represented as ω0. Here, the moving velocity vc of the field of view 33 is equal to the moving velocity vp of the test pattern P. FIG. 3(*c*) shows the image of the test pattern P where the angular velocity is ω0.

Meanwhile, in the foregoing case, the angular velocity ω is varied to determine "the angular velocity at which the image of the test pattern P is captured with the smallest blur, which is represented as ω0". Alternatively, it is also possible to carry out image capture a plural number of times with the exposure time of the CCD camera 3 set to be extremely short while the galvanometer mirror 2 is rotated, and then determine the angular velocity at which the scroll of the test pattern P along the scanning direction is the smallest in all the captured images to be represented as ω0.

FIG. 3(*d*) is an enlarged view of an edge part of the image of the test pattern P in FIG. 3(*c*). The maximum and minimum values of luminance are represented as Imax and Imin, respectively. A luminance lower than Imax by a certain ratio (e.g., 10%) is represented as Imax,th, and a luminance higher than Imin by a certain ratio (e.g., 10%) is represented as Imin,th. The number of pixels between Imax,th and Imin,th is referred to as the "BEW" (Blurred Edge Width).

Meanwhile, since the BEW above includes the width of blur B' of the optical system such as a lens, it is preferable that an image of a static test pattern P is captured to determine the width of blur B' of the optical system such as a lens so that it is subtracted from the BEW above to obtain the net BEW.

The BEW serves as a function of the velocity vp of the test pattern P moving on the screen 5 of the display device subject to evaluation. The greater the vp is, the longer is the BEW, and the smaller the vp is, the shorter is the BEW. Accordingly, BEW is plotted with respect to the moving velocity, and the inclination thereof is defined as N_BEW (in units of time). The BEW that is normalized by the moving velocity, which is N_BEW, is known to correspond to the "Response Time" of the display device. Therefore, evaluation of moving image quality of the display device can be performed by using N_BEW.

In order to determine the foregoing N_BEW, the moving velocity vp of the test pattern P needs to be determined. However, to determine the moving velocity vp, it needs to be estimated based upon the shape of the output signal of the image signal generator 9, screen size of the display device, the number of scanning lines, the frame duration and the like. The calculations thereof are bothersome and errors might be included.

Therefore, in the present invention, the moving velocity vp of the test pattern P is estimated by capturing an image of a static test pattern while the galvanometer mirror 2 is rotated.

Figure 4A:
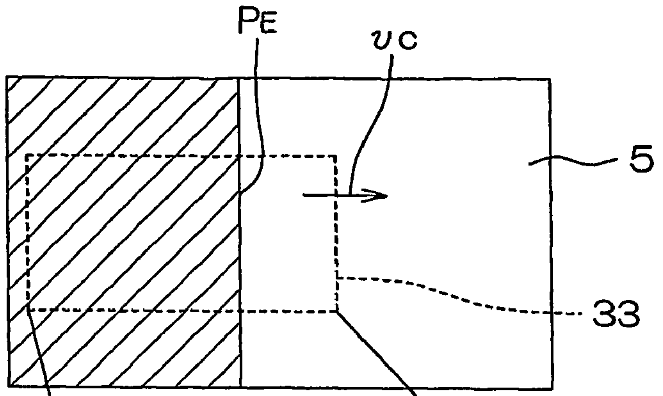
FIGS. 4 (*a*) and 4(*b*) illustrate a method for estimating the moving velocity vp.
Figure 4B:
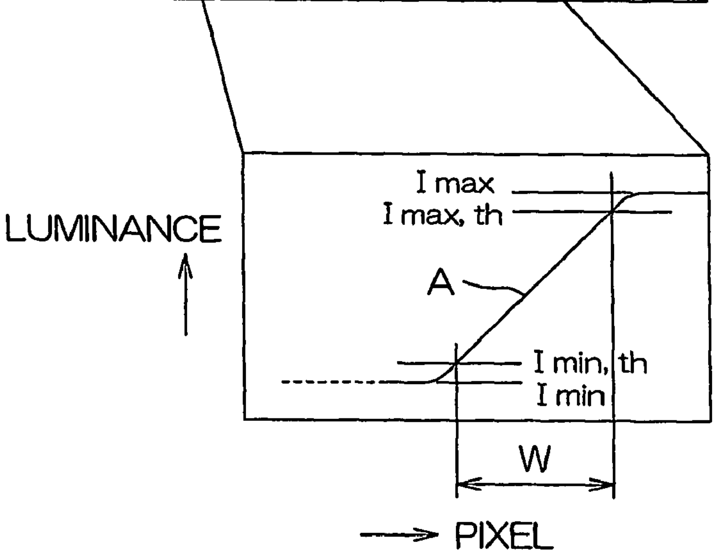

First, in order to estimate the moving velocity vp, a static pattern is utilized. For example, a static pattern comprising an edge PE as shown in FIG. 4(*a*) is used. Incidentally, the static pattern is not limited to the pattern comprising an edge, but may be an arbitrary pattern so long as it includes an edge. In addition, the method for forming the static pattern is also optional. It can be formed by inputting an image signal for a static pattern in the display device, or by projecting a light pattern on the screen of the display device by spot-illumination by means of light emitting diode or laser.

With the static pattern held stationary, the galvanometer mirror is rotated at the foregoing angular velocity of ω0. It is not necessary to know the specific value of the angular velocity ω0 so long as the angular velocity at which the image of the test pattern P is captured with the smallest blur is reproduced as it is. The field of view 33 of the CCD camera 3 follows this and moves at a velocity of vc as shown in FIG. 4(*a*). Since the angular velocity is ω0, the velocity vc is equal to the foregoing moving velocity vp of the test pattern P.

FIG. 4(*b*) shows a luminance distribution profile of an image formed on the detector plane 31 of the CCD camera 3. The image has a slanted rise part A. The rise part A is formed in response to the field of view 33 of the CCD camera 3 passing through the edge PE. The width W of the rise part A is a function of moving velocity vc of the field of view 33 of the CCD camera 3 and exposure time T of the CCD camera 3.

Figure 5A:
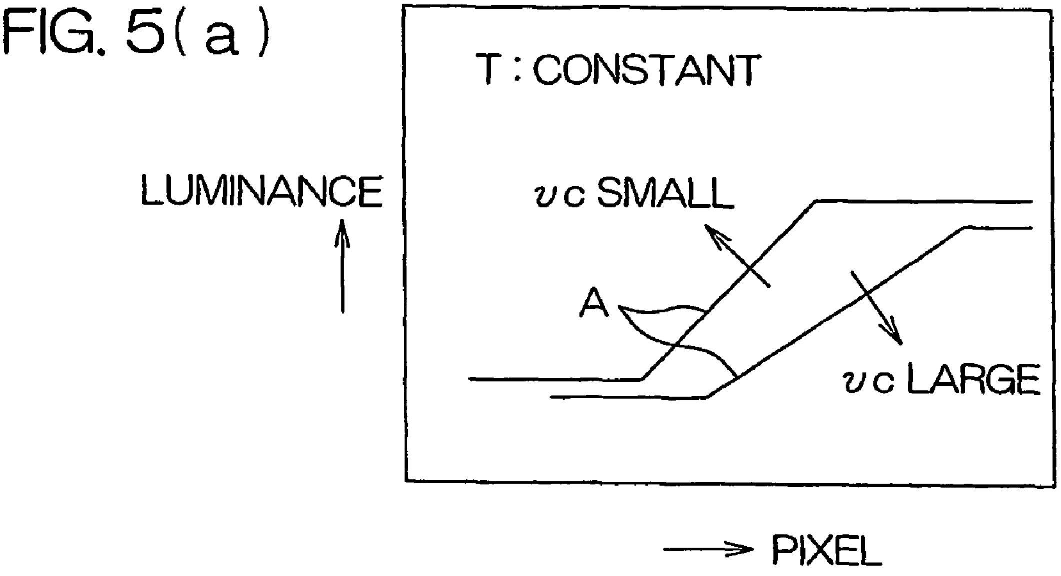
FIG. 5 (*a*) is a graph showing a relationship between rise part A and moving velocity vc where exposure time T is constant, and FIG. 5(*b*) shows a relationship between rise part A and exposure time T where moving velocity vc is constant.
Figure 5B:
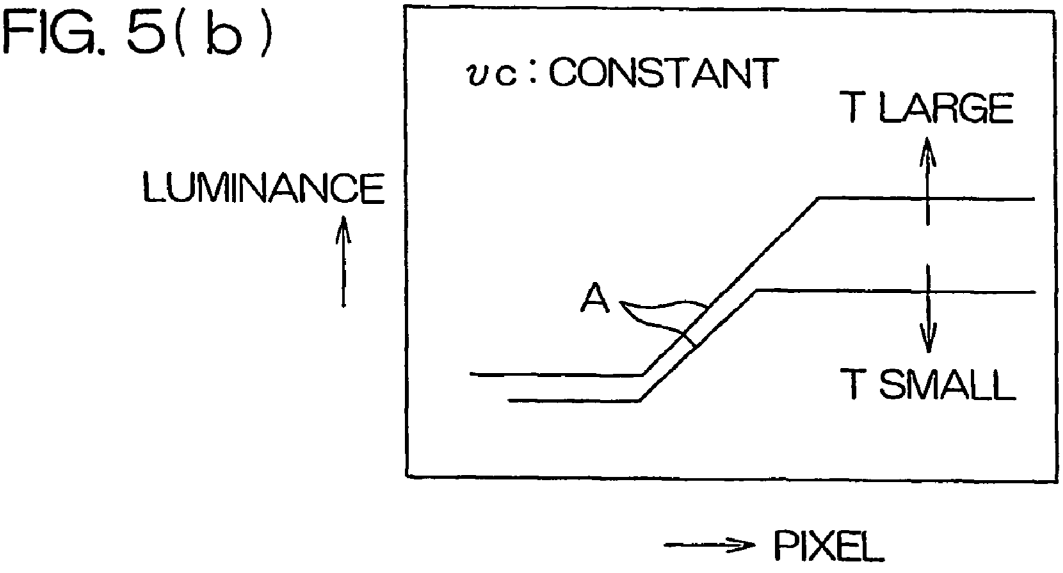

FIG. 5(*a*) is a distribution profile showing a relationship between rise part A and moving velocity vc in a case where exposure time T is constant, in which the greater the moving velocity vc is, the smaller is the inclination of the rise part A, and the smaller the moving velocity vc is, the greater is the inclination of the rise part A.

FIG. 5(*b*) is a distribution profile showing a relationship between rise part A and exposure time T in a case where moving velocity is constant, in which as exposure time T deceases, rise part A moves downward, and as exposure time T increases, rise part A moves upward.

The aforementioned width W equals to distance vc×T, which is the distance traveled by the field of view 33 of the CCD camera 3 during an exposure time T. That is, the pursuing equation is satisfied:

$$W=vc\times T$$

The foregoing discussion is summarized as follows: the static pattern comprising the edge PE is used and an image thereof is captured by the CCD camera 3 while the galvanometer mirror 2 is rotated at the foregoing angular velocity of ω0, and the width W of a rise part A that appears in the detected image is measured. As a result, (moving velocity vc)×(exposure time T) is found.

Meanwhile, since the width W is preferably defined in a manner corresponding to the definition of the blurred edge width BEW in FIG. 3(*d*): the number of pixels between Imax, th and Imin,th, it is defined as the difference in pixel between a part Imin,th at which luminance is higher than the minimum value Imin by a certain ratio (e.g, 10%) and a part Imax,th at which luminance is lower than the maximum value Imax by a certain ratio (e.g., 10%) in an image detected by the CCD camera 3.

Additionally, exposure time T of the CCD camera 3 is a value set for the CCD camera 3.

Accordingly, by measuring the aforementioned width W, the velocity vc of the field of view 33 of the CCD camera 3 moving on the screen 5 of the display device subject to evaluation that corresponds to the angular velocity ω0 of the galvanometer mirror 2 can be determined from the pursuing equation:

$$vc=W/T$$

Since the angular velocity of the galvanometer mirror 2 is ω0, the moving velocity vc is equal to the moving velocity vp of the test pattern P as described above:

$$vp=vc$$

The moving velocity vp of the test pattern P can therefore be determined. Then, N_BEW can be determined by dividing the BEW determined in the foregoing FIG. 3(*d*) by the moving velocity vp:

$$N\_BEW=BEW/vp$$

With use of the N_BEW, the moving image quality of the screen can be evaluated.

In the foregoing method for evaluating moving image quality of displays, a value set for the CCD camera is used for the exposure time T of the CCD camera. However, when the value set for the CCD camera cannot be known exactly, it can be determined by an actual measurement on the assumption that the angular velocity ω of the galvanometer mirror 2 is known.

The test pattern P shown in FIG. 3(*a*) is held stationary and displayed on the screen 5 of the display device subject to evaluation, and with the galvanometer mirror 2 held stationary, an image thereof is captured by the CCD camera 3. As a result, as shown in FIG. 6(*a*), an image with a width corresponding to the sum of the width SPT of the test pattern P and the width B' of a blur of the optical system such as a lens appears on the image plane of the CCD camera 3.

Subsequently, the galvanometer mirror 2 is rotated at a known angular velocity ω, and with the exposure time T set to an arbitrary value, an image of the static test pattern P is captured. As a result, as shown in FIG. 6(*b*), an image having a width corresponding to the sum of the width of the test pattern P, the width B' of a blur of the optical system such as a lens, and pixels ΔY traveled by the image during the exposure time T of the CCD camera 3 appears on the image plane of the CCD camera 3.

Figure 6A:
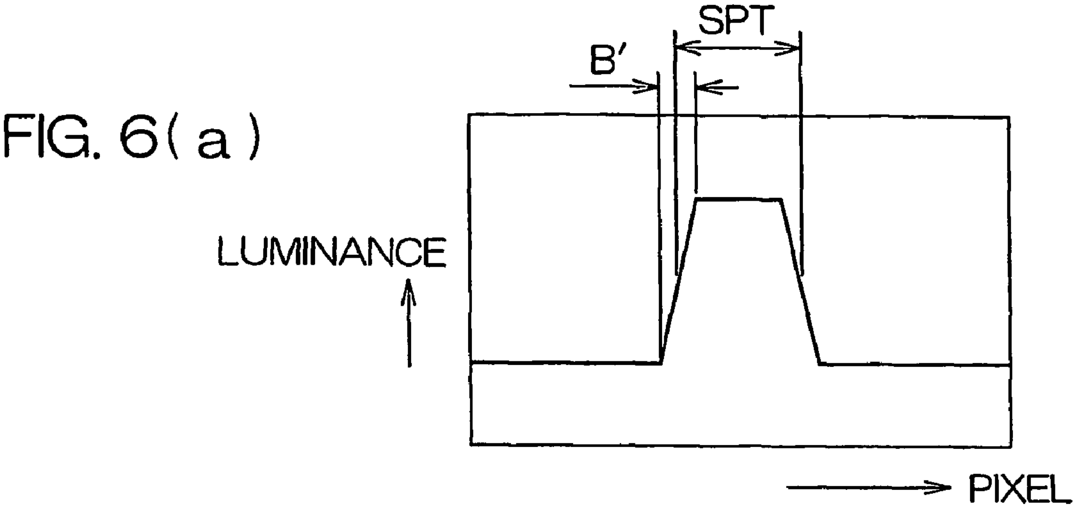
FIG. 6(*a*) shows a luminance distribution profile of a static test pattern P captured by the CCD camera 3 with the galvanometer mirror 2 held stationary, and FIG. 6(*b*) shows a luminance distribution profile of the static test pattern P obtained when the static pattern P is captured while the galvanometer mirror 2 is rotated at a known angular velocity of ω and an exposure time is set for the CCD camera 3.
Figure 6B:
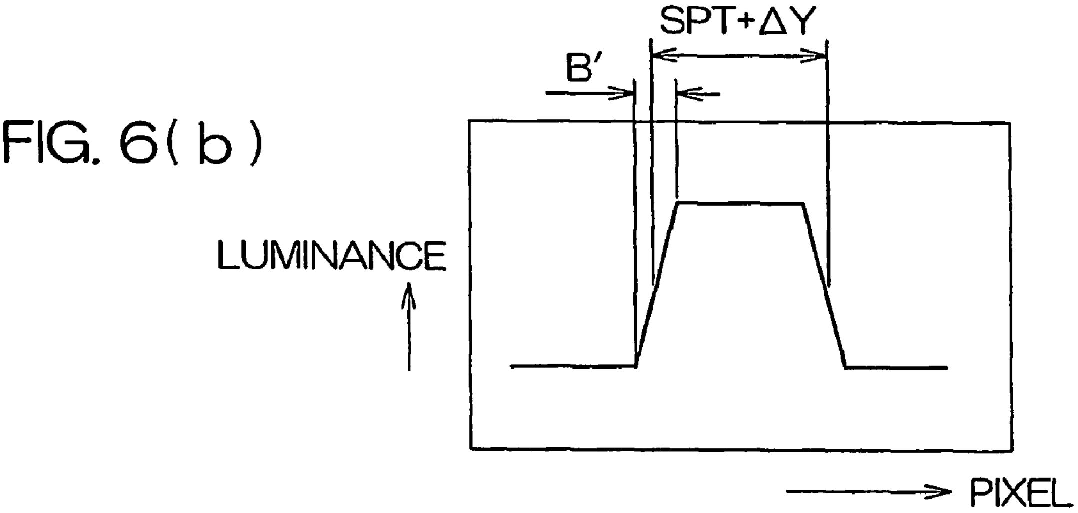

By subtracting the width of the image of FIG. 6(*a*) from the width of the image of FIG. 6(*b*), the pixels ΔY on the image plane corresponding to the exposure time T can be measured. Accordingly, dividing ΔY by the moving velocity v of the field of view 33 of the CCD camera 3 gives the exposure time T:

$$T=\Delta Y/v$$

In addition, since the relationship between the v and the angular velocity ω of the galvanometer mirror 2 has been known from the equation (a) above, the exposure time T can be expressed by using ΔY and ω:

$$T=\Delta Y/2L\omega \quad \text{(b)}$$

Accordingly, by substituting ΔY and the angular velocity ω into the equation (b), the exposure time T can be determined. When a plural number of times of measurements are carried out by varying the angular velocity ω to determine the exposure time T for each case and the average thereof is taken, more reliable value for exposure time T can be obtained.

Alternatively, the exposure time T of the CCD camera 3 may be determined such that with the galvanometer mirror 2 rotated at a certain angular velocity (which does not need to be a known value), pulsed light with a predetermined period is captured by the CCD camera 3, and the number of the light spots that appears on the detector plane of the image sensor is measured.

In the present invention described so far, since the scroll of the test pattern P is one-dimensional, images displayed on the detector plane 31 of the CCD camera 3 have a rectangular shape. Because no information is included in the direction perpendicular to the moving direction of the test pattern P, taking the sum of pixel signals on the detector plane of the CCD camera 3 in the direction perpendicular to the moving direction of the test pattern P allows the noise component of each pixel signal to be reduced, so that detection sensitivity can be improved.

While specific embodiments of the present invention have been heretofore described, it should be understood that implementation of the present invention is not limited to the foregoing embodiments, but various modifications may be made within the scope of the present invention. For example, the galvanometer mirror 2 may be substituted by a rotatable mirror driven by an electric motor, or the galvanometer mirror 2 and the CCD camera 3 may be substituted by a rotatable CCD camera.

The still test image can be replaced with any type of light source for example of LED.

The invention claimed is:

1. A method for evaluating moving image quality of displays based on a blurring of a scrolled test pattern displayed on a screen of a display device subject to evaluate, the method comprising the following steps (a)-(f) of:

(a) capturing an image of the scrolled test pattern while the test pattern being scrolled and the field of view of an image sensor pursuing with a move of the test pattern;

(b) observing a first blurred edge along a scrolling direction that appears in the captured image of the scrolled test pattern;

(c) capturing an image of a still test pattern by the image sensor while moving the field of view of the image sensor at a same velocity as that at which the field of view of the image sensor pursues a move of the scrolled test pattern;

(d) observing a second blurred edge along the scrolling direction that appears in the captured image, which is the image of the still test pattern captured by the image sensor;

(e) estimating the moving velocity of the scrolled test pattern based upon the second blurred edge width and the exposure time of the image sensor at which the image of the still test pattern was captured, and normalizing the first blurred edge width by using the estimated moving velocity of the scrolled test pattern; and (f) evaluating moving image quality of the screen with use of the normalized first blurred edge width.

2. The method for evaluating moving image quality of displays according to claim 1, wherein in the step (a), the field of view of the image sensor is moved at a variety of velocities to capture an image of the scrolled test pattern, which is scrolled at an arbitrary velocity, and a moving velocity of the field of view of the image sensor, at which the first blurred edge width appeared in the captured image is the smallest, is determined to be the velocity at which the move of the scrolled test pattern is pursued.

3. The method for evaluating moving image quality of displays according to claim 1, wherein in the step (a) the scrolled test pattern is scrolled at an arbitrary velocity, the field of view of the image sensor is moved at a variety of velocity, consecutive images of the scrolled test pattern are captured at the each velocity, and a moving velocity of the field of view of the image sensor, at which the move of positions of blurred edge in the captured consecutive images is the smallest in the moving direction, is determined to be the velocity at which the move of the scrolled test pattern is pursued.

4. The method for evaluating moving image quality of displays according to claim 1, wherein in the step (b), the first blurred edge width corresponds to the difference in pixel number between a position at which the luminance is higher than the minimum luminance by a predetermined threshold ratio or predetermined threshold value and a position at which the luminance is lower than the maximum luminance by a predetermined threshold ratio or predetermined threshold value in a luminance distribution profile focused on the detector of the image sensor.

5. The method for evaluating moving image quality of displays according to claims 1 or claim 4, wherein in the step (d), the second blurred edge width corresponds to the difference in pixel number between a position at which the luminance is higher than the minimum luminance by a predetermined threshold ratio or predetermined threshold value and a position at which the luminance is lower than the maximum luminance by a predetermined threshold ratio or predetermined threshold value in a luminance distribution profile focused on the detector surface of the image sensor.

6. The method for evaluating moving image quality of displays according to claim 1, wherein in the step (e), the exposure time of the image sensor is determined from an image of still test pattern focused on the detector surface of the image sensor while moving the field of view of the image sensor at a known velocity.

7. The method for evaluating moving image quality of displays according to claim 1, wherein in the step (e), the exposure time of the image sensor is determined by capturing an image of pulsed light with a predetermined period, and measuring the number of times of detection of the light appearing on the detector plane of the image sensor.

8. A system for evaluating moving image quality of displays based upon a blurring of a scrolled test pattern displayed on a screen of a display device subject to evaluate, the system comprising the following means (A)-(D):

(A) means for capturing an image of the test pattern while moving the test pattern on the screen at an arbitrary velocity with the filed of view of an image sensor pursuing the move of the scrolled test pattern, and observing a first blurred edge along a moving direction that appears in the captured image of the scrolled test pattern;

(B) means for capturing an image of still test patterns by the image sensor while moving the field of view of the image sensor at the same velocity as that at which the field of view of the image sensor pursues the move of the scrolled test pattern, and for observing a second blurred edge along the scrolling direction that appears in the captured image, which is the image of the still test pattern captured by the image sensor;

(C) means for estimating the moving velocity of the scrolled test pattern based upon the second blurred edge width and the exposure time of the image sensor to capture the image of a still test pattern, and normalizing the first blurred edge width by using the estimated moving velocity of the scrolled test pattern; and (D) means for evaluating moving image quality of the screen with use of the normalized first blurred edge width.

* * * * *